Patented Feb. 21, 1933

1,898,971

UNITED STATES PATENT OFFICE

ERNST JAENECKE, OF HEIDELBERG, AND FRITZ MUELLER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

PRODUCTION OF FERTILIZER SALTS

No Drawing. Application filed October 25, 1929, Serial No. 402,537, and in Germany November 24, 1928.

The present invention relates to the production of fertilizer salts.

Various processes for the manufacture and production of fertilizer salts by the double decomposition of salts are already known. In all of these known processes, the reaction is carried out in the presence of water or aqueous solutions of ammonia.

We have now found a new process for the manufacture and production of fertilizers by the double decomposition of such salts as are soluble in liquid ammonia at least to a slight extent, in which the reaction is effected in the presence of an ammoniacal medium, that is a substantially or completely anhydrous medium of liquid or gaseous ammonia. Thus the process in accordance with the present invention may be carried out in liquid ammonia or solutions containing the same which are poor in, or free from, water, as for example Divers' liquid which consists of liquid ammonia and ammonium nitrate. The conversion proceeds with particular advantage in the entire absence of water, in case salts very sensitive to water such as certain carbamates are produced. In other cases, namely when salts stable against water are produced and when it is desired to increase the solubility of the initial materials in the ammonia, it is permissible, or even desirable, to work in the presence of subordinate quantities of water, for example up to about 10 per cent of the ammonia; for the same purpose it is often preferable to work at elevated temperatures, such as up to about 100° C. and in a closed vessel, depending on the nature of the initial materials.

The process in accordance with the present invention in its simplest form may be carried out by removing the excess of ammonia after the conversion of two salts which have been introduced into liquid ammonia, whereupon any small quantity of water which is present is likewise removed, and the residue is then directly employed for fertilizing. The separate salts, however, may be isolated and used as fertilizers. For example, in the conversion of alkali metal chloride with ammonium nitrate the alkali metal nitrate which separates out may be filtered off and ammonium chloride may be recovered from the filtrate by evaporating off the ammonia; or the ammonia may be evaporated off first, in which case a mixture of alkali metal nitrate and ammonium chloride is obtained. Moreover, other suitable additions may be made before or after the removal of ammonia for the purpose of producing mixed or complete fertilizers, for example urea or phosphates or iodides or mixtures thereof. In many cases it is advantageous to incorporate salts fixing or absorbing ammonia, for example ammonium nitrate or alkali earth metal chlorides.

The process may also be carried out, for example, by passing gaseous ammonia over the salt mixture which is to be converted until a liquefaction occurs, for example with the formation of a pulpy or pasty mass.

Conversion even takes place when gaseous ammonia is passed over or through the salt mixture to be converted without the occurrence of a liquefaction of the mass. That a conversion takes place by this manner of working can probably be explained by assuming that a liquid containing ammonia, for example Divers' liquid, is temporarily formed in the form of very fine droplets, invisible to the naked eye, within the reaction mixture, and this renders the occurrence of a reaction possible.

The following examples will further illustrate the nature of this invention, but the invention is not restricted to these examples. The parts are by weight.

Example 1

Sodium chloride is heated in a closed vessel to a temperature of about 100° C. in Divers' liquid (consisting of approximately equal parts by weight of ammonium nitrate and liquid ammonia) and the solution is then separated from the remainders of sodium chloride by filtration at the same temperature. Sodium nitrate separates out from the cooled filtrate and may be freed from the mother liquor by filtration.

Example 2

The procedure described in Example 1 is followed except that the sodium nitrate is not separated from the mother liquor by filtration, but the excess of ammonia is removed by evaporation. A mixture of sodium nitrate, ammonium nitrate and ammonium chloride is left behind.

Example 3

Potassium chloride is heated under pressure to a temperature of 100° C. in Divers' liquid and the excess is then separated from the solution by filtration. Carbon dioxide is then passed into the solution obtained in such quantity that a part of the potassium nitrate formed is converted into potassium carbamate. The solution is then allowed to cool and the deposited mixture of salts is filtered off from the mother liquor. This mixture is heated with ammonia under pressure and finally a mixture is obtained which may be employed as a mixed fertilizer and which consists of the following constituents: potassium nitrate, urea, potassium carbonate and ammonium chloride.

Example 4

Potassium chloride is shaken with Divers' liquid at a temperature of 0° C. A conversion into potassium nitrate and ammonium chloride occurs. After filtration potassium nitrate remains in the residue while ammonium chloride remains in the solution.

Example 5

192 kilograms of dipotassium phosphate are stirred with 200 liters of a solution of 176 kilograms of ammonium nitrate in liquid ammonia at room temperature. A pulpy mass is formed which is freed from ammonia, if necessary by warming, and a solid mass remains. A product which mainly consists of triammonium phosphate and potassium nitrate and which contains 16.8 per cent of N, 21.2 per cent of $P_2O_5$, and 28.1 per cent of $K_2O$ is obtained.

Example 6

Gaseous ammonia is passed over a mixture of 150 kilograms of monopotassium phosphate and 83 kilograms of ammonium nitrate until a pulpy mass is formed; this is then gently heated for the purpose of expelling the ammonia. A product consisting of triammonium phosphate and potassium nitrate is obtained which contains 18 per cent of N, 30.5 per cent of $P_2O_5$, and 20.2 per cent of $K_2O$.

Example 7

Ammonia is passed in a rapid stream over an intimate solid mixture of approximately equal parts of dipotassium phosphate and ammonium nitrate. The appearance of the mass changes without its becoming pulpy or liquid. A conversion takes place with the absorption of ammonia. After several hours dry air is passed over the dry mass instead of ammonia. A dry, dusty product is obtained which contains 17.8 per cent of N, 20 per cent of $P_2O_5$, and 26.5 per cent of $K_2O$, and which consists of ammonium phosphate and potassium nitrate.

Example 8

About 2 parts of monopotassium phosphate and 1 part of ammonium nitrate are treated as described in Example 7. The conversion takes place in the stream of ammonia without the mass becoming pulpy or liquid. After evaporating off the excess of gaseous ammonia and the loosely combined ammonia, a product is obtained which contains 16.7 per cent of N, 31 per cent of $P_2O_5$, and 20 per cent of $K_2O$, and which consists of ammonium phosphate and potassium nitrate.

Example 9

100 kilograms of gypsum are stirred at room temperature into 300 liters of Divers' liquid. After about 6 hours the gypsum is quantitatively converted into calcium nitrate and ammonium sulphate. By filtration 95 kilograms of solid ammonium sulphate are obtained. The calcium nitrate may be recovered as such from the mother liquor or carbon dioxide may be pressed into the mother liquor, whereby the calcium nitrate is converted into calcium carbamate which may be worked up into calcium cyanamide.

What we claim is:

1. The process of producing fertilizer salts which comprises effecting double decomposition between ammonium nitrate and a metal salt which is soluble in liquid ammonia at least to a slight extent, in contact with substantially anhydrous ammonia.

2. The process of producing fertilizer salts which comprises effecting double decomposition between ammonium nitrate and a metal salt which is soluble in liquid ammonia at least to a slight extent, in contact with substantially anhydrous liquid ammonia.

3. The process of producing fertilizer salts which comprises effecting double decomposition between ammonium nitrate and a metal salt which is soluble in liquid ammonia at least to a slight extent, in contact with anhydrous liquid ammonia.

4. The process of producing fertilizer salts which comprises effecting double decomposition between an alkali metal chloride and ammonium nitrate, in contact with substantially anhydrous ammonia.

5. The process of producing fertilizer salts which comprises effecting double decomposition between an alkali metal chloride and ammonium nitrate, in contact with substantially anhydrous liquid ammonia.

6. The process of producing fertilizer salts which comprises effecting double decomposition between an alkali metal chloride and ammonium nitrate, in contact with anhydrous liquid ammonia.

7. The process of producing fertilizer salts which comprises effecting double decomposition between potassium chloride and ammonium nitrate, in contact with substantially anhydrous ammonia.

8. The process of producing fertilizer salts which comprises effecting double decomposition between potassium chloride and ammonium nitrate in contact with anhydrous liquid ammonia.

9. The process of producing fertilizer salts which comprises effecting double decomposition between potassium chloride and ammonium nitrate in contact with anhydrous liquid ammonia, separating the potassium nitrate, and evaporating the ammonia from the remaining liquid.

In testimony whereof we have hereunto set our hands.

ERNST JAENECKE.
FRITZ MUELLER.